United States Patent
Kawamoto

(10) Patent No.: US 7,173,618 B2
(45) Date of Patent: Feb. 6, 2007

(54) IMAGE CREATION PROGRAM AND METHOD OF CREATING IMAGE

(75) Inventor: Kouichi Kawamoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 406 days.

(21) Appl. No.: 10/921,978

(22) Filed: Aug. 20, 2004

(65) Prior Publication Data
US 2005/0046625 A1  Mar. 3, 2005

(30) Foreign Application Priority Data
Sep. 3, 2003  (JP) .............................. 2003-311790

(51) Int. Cl.
*G06T 15/00* (2006.01)
(52) U.S. Cl. ...................... 345/427; 345/582
(58) Field of Classification Search ........... 345/427, 345/582
See application file for complete search history.

(56) References Cited

U.S. PATENT DOCUMENTS

| | | | |
|---|---|---|---|
| 6,195,104 B1 * | 2/2001 | Lyons | 345/473 |
| 6,346,938 B1 * | 2/2002 | Chan et al. | 345/419 |
| 6,405,975 B1 * | 6/2002 | Sankrithi et al. | 244/1 R |
| 6,476,812 B1 * | 11/2002 | Yoshigahara et al. | 345/427 |
| 6,614,427 B1 * | 9/2003 | Aubrey | 345/419 |
| 6,686,850 B2 * | 2/2004 | Hausmann | 340/967 |
| 6,795,069 B2 * | 9/2004 | Raskar et al. | 345/419 |

FOREIGN PATENT DOCUMENTS

| | | |
|---|---|---|
| JP | 10-179932 | 7/1998 |
| JP | 2000-93654 | 4/2000 |
| JP | 3068205 | 5/2000 |

* cited by examiner

*Primary Examiner*—Almis R. Jankus
(74) *Attorney, Agent, or Firm*—Nixon & Vanderhye P.C.

(57) ABSTRACT

A character object 2001 which stands on a ground in a virtual space is arranged to rise on a land object 1802. Here, the character object 2001 is arranged to look towards a side of a virtual camera 1601. Further, the land object 1802 is arranged so as to be displaced a predetermined distance from its original position along a direction of the orientation of the virtual camera 1601 and in a direction away from the virtual camera 1601. This prevents a character arranged on a ground in a 3D virtual space from being displayed as if a part of the character sank into the ground.

10 Claims, 13 Drawing Sheets

FIG. 14A     FIG. 14B     FIG. 14C
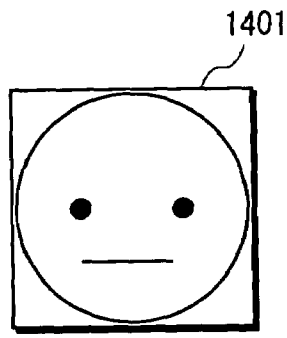 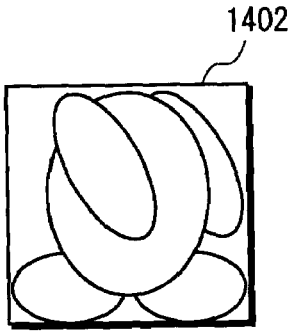 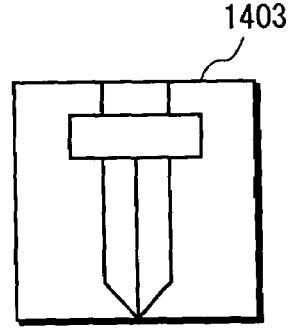
FIG. 15A     FIG. 15B
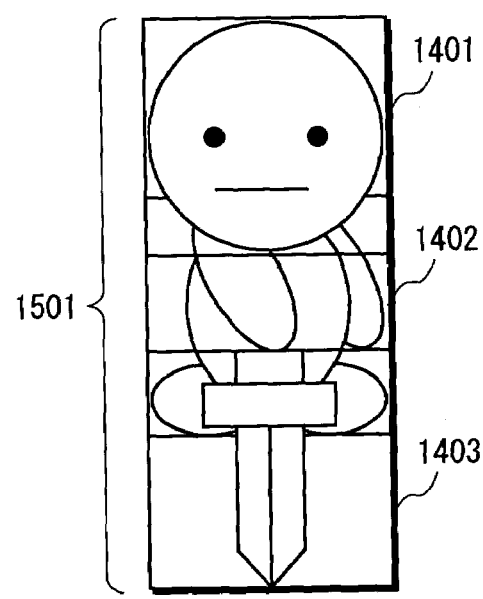 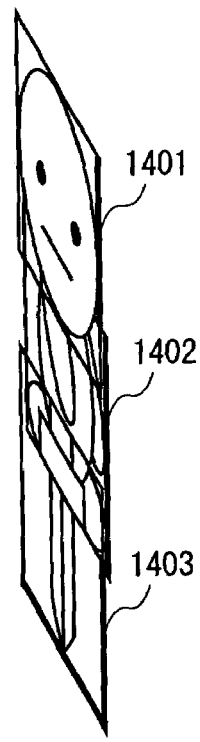

IMAGE CREATION PROGRAM AND METHOD OF CREATING IMAGE

BACKGROUND OF THE INVENTION

1. Field of the Invention

The present invention relates to an image creation program and a method of creating an image, and more particularly to image processing in a video game machine having a 3D image processing function.

2. Description of the Background Art

With recent technical advance, high-performance video game machines having built-in 3D image processing circuits, such as a geometry arithmetic circuit and a rendering circuit, have come along. In such video game machines, an image corresponding to a scene viewed from a virtual camera is created by transforming a plurality of 3D objects arranged in a 3D virtual space (the world coordinate system) into the 2D screen coordinate system which is based on the virtual camera by performing geometry calculation, and then mapping texture onto polygons of the objects having been transformed into 2D coordinates.

Conventionally, in the case of displaying a character or the like walking on the land, in particular, as described in patent document 1 (Japanese Patent No. 3068205 (FIGS. 4 and 6)) and patent document 2 (Japanese Laid-Open Patent Publication No. 2000-93654 (FIGS. 4 and 11)), a 3D game image is displayed by arranging a character object on a land object and displaying a scene of the character object and the land object viewed from a virtual camera.

As a technique for displaying a game screen using a planar polygon, there is known a conventional technique described in patent document 3 (Japanese Laid-Open Patent Publication No. 10-179932 (FIG. 4)). Making a blast pattern or the like into a 3D object makes game creation complicated. However, according to the above conventional technique, by mapping a blast pattern onto a planar polygon which look towards the viewing direction at all times, the blast pattern can be displayed in a 3D format with simple processing.

Creation of a 3D game program such as that described in patent documents 1 and 2, however, involves creating a 3D object using a plurality of polygons and creating a realistic image to be mapped onto the object. Accordingly, creating a game program takes a very long time.

In recent years, due to the aforementioned problem, even game titles for which high sales cannot be expected require a certain amount of time to develop their game programs, causing another problem that development costs cannot be recovered eventually.

There is a move to port outdated game programs which are developed for low-function game machines having no built-in 3D image processing circuits or for outdated game machines. However, the game programs of such game machines include only 2D image data, such as characters and land, and do not include 3D objects composed of polygons and realistic texture to be mapped onto the objects. Therefore, it is not easy to port the game programs of such game machines to game machines having built-in 3D image processing circuits.

To overcome the above problems, with reference to patent document 3, an image of a character may be mapped onto a non-dimensional, planar polygon, whereby porting of game programs of outdated game titles may be realized or the development time for game programs may be reduced.

As is clear from patent documents 1 and 3, technically, it is common practice in conventional 3D game programs to arrange character objects such as people and blasts to be displayed on the land, on a land object and arrange birds, in-air blasts, or the like at a location away from the land object.

In the case, for example, of porting an outdated game program using a 2D image included therein, however, the following problem occurs.

For example, in recent 3D games, in a virtual space including a virtual camera 1601, a character object 1602, an another object 1603, and a land object 1604, as shown in FIG. 16, when the character object 1602 which is holding a sword longer than half length thereof brings down the sword forward, as shown in FIG. 17, the sword is brought down in a diagonal arc and thus the resulting image to be displayed is not such that the long sword is sinking into the ground.

Now, the case where as in patent document 3, planar polygons are used in place of the 3D objects in FIG. 16 will be discussed. In this case, as shown in FIGS. 18A and 18B, planar polygons 1801 and 1802 are prepared onto which texture viewed from a virtual camera are mapped on an object-by-object basis. Then, the polygons 1801 and 1802 are superimposed and displayed such as that shown in FIG. 18C. FIG. 19 is a diagram showing the planar polygons 1801 and 1802 arranged in a manner shown in FIG. 18C as viewed from a direction perpendicular to the virtual camera. Similarly, in the case of expressing an action of the character bringing the long sword down, as shown in FIG. 20A, a texture of the character performing such an action is mapped onto a planar polygon 2001 (which may be the same polygon as the planar polygon 1801) and then the planar polygons 2001 and 1802 are superimposed and displayed. Here, if the planar polygon 2001 is arranged such that the character is standing in the same position as that of FIG. 18C, the planar polygon 2001 turns out to sink into the ground as shown in FIG. 20C. Accordingly, the resulting image is displayed such that the sword brought down in a diagonal arc by the character sank into the ground.

In a 2D virtual space, even if using an image such that the edge of a sword is located below the feet of a character, no particular problems arise. However, as in the above case, when in a 3D virtual space, an image such that the edge of a sword is located below the feet of a character is mapped, as texture, onto a polygon arranged so as to stand on a land object, a problem that a part of the sword is not displayed arises. The problem is more serious when an image of a character throwing something longer than a sword (e.g., a lasso) is mapped onto a polygon as texture.

SUMMARY OF THE INVENTION

Therefore, an object of the present invention is to provide an image creation program and a method of creating an image, which prevent a character arranged on a ground in a 3D virtual space from being displayed as if a part of the character sank into the ground.

The present invention has the following features to attain the object mentioned above. It is to be understood that reference numerals, etc., in parentheses are provided for the purpose of assisting in the understanding of the present invention and showing the corresponding relationship with an embodiment, as will be described later, and thus are not intended to limit the scope of the present invention.

According to a first aspect of the present invention, there is provided an image creation program for causing a computer to perform a process of creating an image to be viewed from a virtual camera (1601) in a 3D virtual space having arranged therein objects, by performing a projection transformation of a scene in the 3D virtual space onto a projection plane which is based on the virtual camera, and rendering the scene in a rendering region (210).

The image creation program allows the computer to act as object reading means (CPU 202 which performs step S705; hereinafter only step numbers will be provided), first arrangement means (S706), second arrangement means (S706), texture reading means (S707), and rendering means (S708, S710). More specifically, the object reading means reads a first object (1501, 1801) and a second object (1802) from a memory (214), the first object being composed of at least one polygon and in a planar format and the second object being composed of at least one polygon. The first arrangement means arranges the read first object to rise on a horizontal plane in the 3D virtual space (i.e., the horizontal plane and the first object are not parallel to each other and the positional relationship between the horizontal plane and the first object is not limited to a perpendicular relationship) (FIGS. 3 and 12). The second arrangement means arranges the read second object in an opposite direction (the directions shown by the arrows in FIGS. 3 and 12) to a direction in which the horizontal plane looks towards the virtual camera, and substantially parallel to the horizontal plane with a space between the horizontal plane and the second object. The texture reading means reads ground texture and character texture from the memory (214), the ground texture used in representing a ground in the 3D virtual space and the character texture used in representing a character (which includes not only a person but also a blast pattern, etc.) to be displayed in a position which is in contact with the ground. The rendering means renders the image in the rendering region by performing a projection transformation of the first object and the second object onto the projection plane, mapping the read character texture onto the first object, and mapping the read ground texture onto the second object.

The first arrangement means and the second arrangement means arrange the first object and the second objects such that the positional relationship between the first and second objects is displaced a predetermined distance from its original positional relationship along the direction of the orientation of the virtual camera. In arranging the objects, either the first or second object may be displaced from its original position (FIGS. 3 and 11), or both the first and second objects may be displaced from their original positions. Such a displacement may be performed when the object is arranged in the virtual space or when the coordinates of the object is transformed into the camera coordinate system for rendering of the virtual space. Further, the displacement process may be performed using a transformation matrix.

According to a second aspect of the present invention, in the image creation program of the first aspect, the first arrangement means may arrange the first object such that a plane of the first object is substantially perpendicular to the horizontal plane and looks towards a side of the virtual camera.

According to a third aspect of the present invention, in the image creation program of the first aspect, the first arrangement means may arrange the first object such that a plane of the first object looks towards the virtual camera.

According to a fourth aspect of the present invention, in the image creation program of any of the first to third aspects, a size of the first object may change depending on a display content of the character texture, and the second arrangement means may arrange the second object with a space between the horizontal plane and the second object, the space being equal to or greater than a length of the change in the size of the first object in a direction perpendicular to the horizontal plane.

According to a fifth aspect of the present invention, in the image creation program of any of the first to fourth aspects, the first object may be one of a game character and a special-effect character, the game character being modeled after a person in the 3D virtual space and the special-effect character displaying a special effect to be created in the 3D virtual space.

According to a sixth aspect of the present invention, in the image creation program of any of the first to fifth aspects, the computer may further be allowed to act as means for arranging the virtual camera in the 3D virtual space such that an orientation of the virtual camera forms an acute angle with the horizontal plane.

According to a seventh aspect of the present invention, there is provided a method of creating an image of a 3D virtual space to be viewed from a virtual camera arranged in the 3D virtual space. The method comprises the steps of: arranging in the 3D virtual space at least a land object (1802) corresponding to land and a character object (1501, 1801) corresponding to a character which stands on the land (S706); and rendering the land object and the character object arranged in the 3D virtual space such that a positional relationship between the character and land objects is displaced a predetermined distance from its original positional relationship along a direction of an orientation of the virtual camera (S708, S710 and FIGS. 3, 11 to 13).

According to an eighth aspect of the present invention, the character object may be in a planar format; at the arrangement step, the character object may be arranged on a ground in the 3D virtual space so as to be substantially perpendicular to the ground, the ground being specified by the land object; and at the rendering step, texture which represents a character may be mapped onto the character object.

According to a ninth aspect of the present invention, at the arrangement step, the land object and the character object may be arranged such that a positional relationship between the character and land objects is displaced a predetermined distance from its original positional relationship along a direction of an orientation of the virtual camera (FIGS. 3 and 11).

According to a tenth aspect of the present invention, at the rendering step, when positions of the land object and the character object are transformed into the camera coordinate system based on a position of the virtual camera, a Z coordinate value of one of the land object and the character object may be displaced a predetermined value (FIGS. 12, 13).

According to the present invention, it is possible to prevent a character arranged on a ground in a 3D virtual space from being displayed as if a part of the character sank into the ground.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 14A to 14C are diagrams showing exemplary polygons which compose a character object;

FIGS. 15A and 15B are diagrams showing an exemplary configuration of the character object;

DESCRIPTION OF THE PREFERRED EMBODIMENTS

Figure 1:
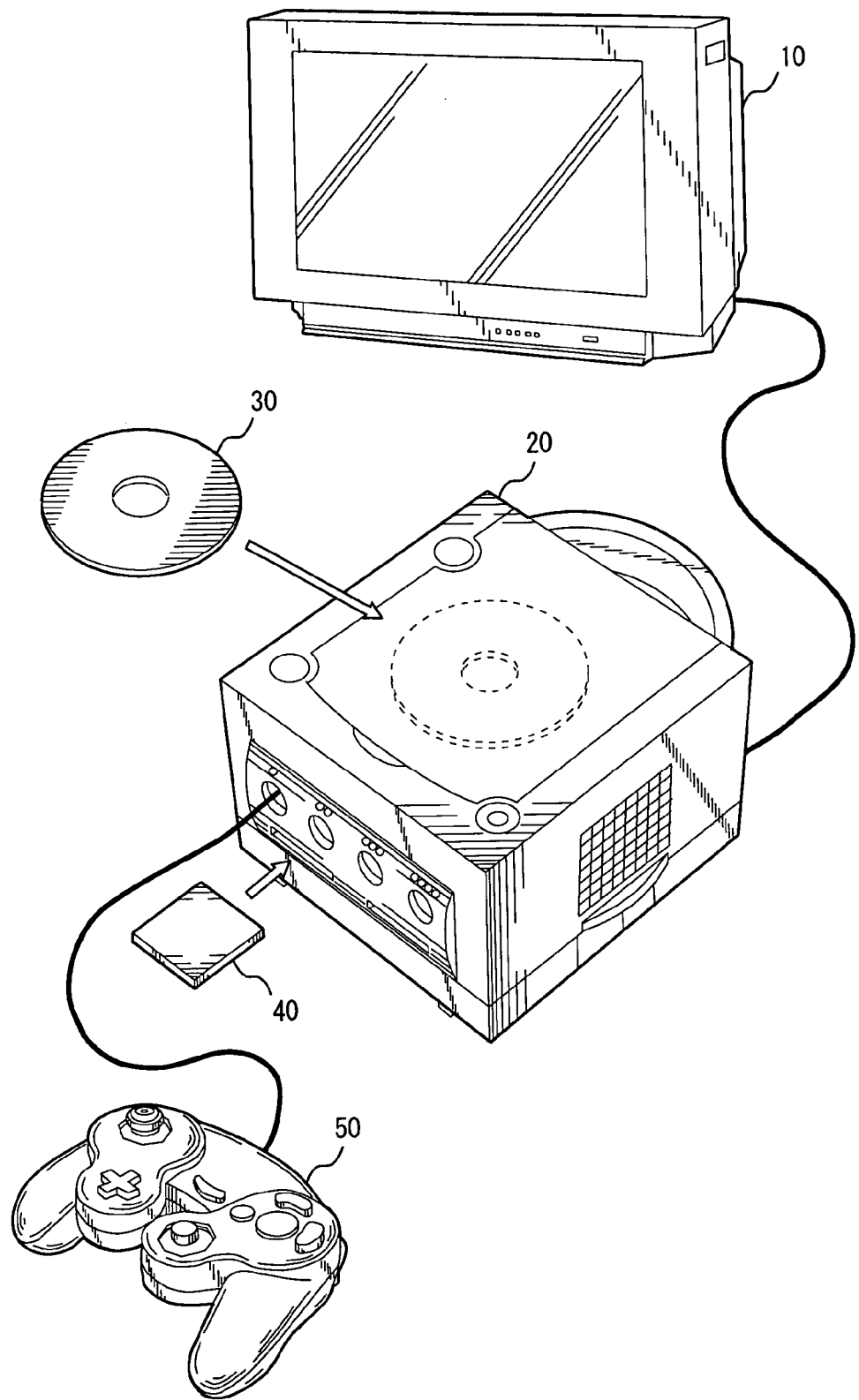
FIG. 1 is an external view of a game system according to an embodiment of the present invention.
Figure 2:
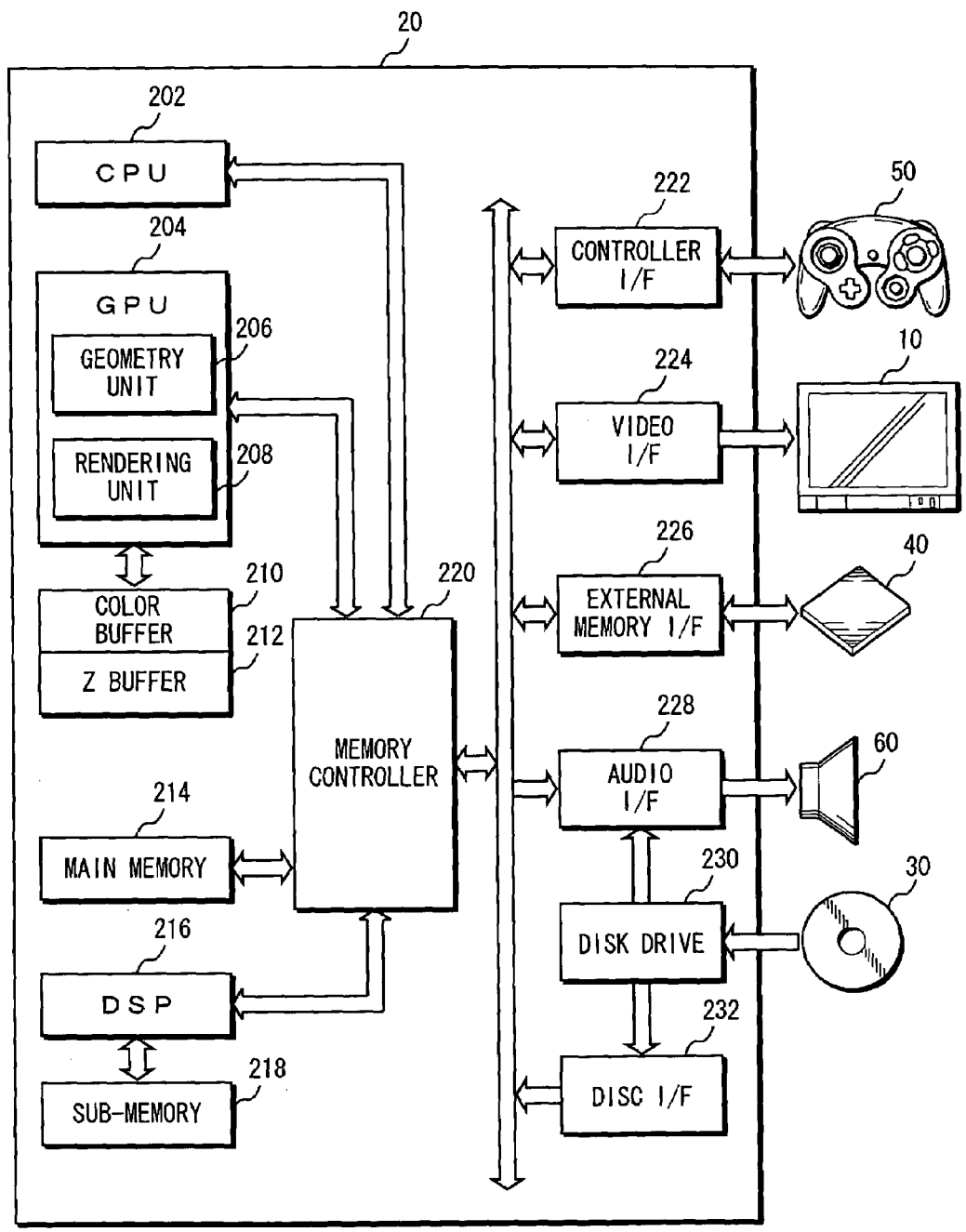
FIG. 2 is a block diagram showing the internal configuration of a main unit 20 of the game machine.

FIG. 1 is an external view showing the configuration of a game system, and FIG. 2 is a block diagram of the game system. As shown in FIGS. 1 and 2, the game system includes a TV monitor 10, a main unit 20 of the game machine, a DVD-ROM 30, an external memory card 40, a controller 50, and a speaker 60. The DVD-ROM 30 and the external memory card 40 can be loaded into and unloaded from the main unit 20 of the game machine at will. The controller 50 is connected through a communication cable to any one of a plurality of controller port connectors (four connectors in FIG. 1) of the main unit 20 of the game machine. The TV monitor 10 and the speaker 60 are connected to the main unit 20 of the game machine through AV cables, or the like. Note that the main unit 20 of the game machine and the controller 50 may communicate by radio communication. Each component of the game system will be described in more detail below with reference to FIG. 2.

The DVD-ROM 30 has game program, game data, and the like stored thereon permanently. When a player plays a game, the DVD-ROM 30 is loaded into the main unit 20 of the game machine. As a means of storing a game program and the like, an external storage medium such as a CD-ROM, an MO, a memory card, or a ROM cartridge, for example, may also be used instead of the DVD-ROM 30.

The external memory card 40 is composed of a rewritable storage medium such as a flash memory, for example, and stores data such as save data of a game, for example.

The main unit 20 of the game machine reads a program stored on the DVD-ROM 30 and performs processes in accordance with the read program.

The controller 50 is an input apparatus used by the player to make inputs regarding game operations, and has a plurality of control switches. The controller 50 outputs operation data to the main unit 20 of the game machine based on the player's operation (e.g., a pressing operation) performed on the control switches.

The TV monitor 10 displays image data outputted from the main unit 20 of the game machine on a screen. The speaker 60 is typically built in the TV monitor 10 and outputs the sound of the game outputted from the main unit 20 of the game machine.

Next, the configuration of the main unit 20 of the game machine will be described. In FIG. 2, in the main unit 20 of the game machine there are provided a CPU 202 and a memory controller 220 connected to the CPU 202. Further, in the main unit 20 of the game machine, the memory controller 220 is connected to a GPU (Graphics Processing Unit) 204, a main memory 214, a DSP 216, and various interfaces (I/F) 222, 224, 226, 228, and 232. The memory controller 220 controls data transfer between these components.

Upon the start of the game, first, a disk drive 230 drives the DVD-ROM 30 loaded into the main unit 20 of the game machine. The game program stored on the DVD-ROM 30 is read into the main memory 214 through the disk I/F 232 and the memory controller 220. The program in the main memory 214 is executed by the CPU 202, thereby starting the game. After the game has started, the player makes an input regarding a game operation, etc., to the controller 50 using the control switches. In response to the input from the player, the controller 50 outputs operation data to the main unit 20 of the game machine. The operation data outputted from the controller 50 is supplied to the CPU 202 through the controller I/F 222 and the memory controller 220. The CPU 202 performs game processing in accordance with the inputted operation data. When producing image data, etc., during the game processing, the GPU 204 and the DSP 216 are used. A sub memory 218 is used when the DSP 216 performs a process.

The GPU 204 has a geometry unit 206 and a rendering unit 208, and is connected to a memory dedicated to image processing. The image-processing dedicated memory is used as a color buffer 210 and/or a Z buffer 212, for example. The geometry unit 206 performs computations regarding the coordinates of a 3D model (e.g., an object composed of polygons) such as an object or graphic placed in a game space which is a 3D virtual space. For example, the geometry unit 206 performs rotation, scaling, and deformation on a 3D model or performs transformation from the world coordinate system to the camera coordinate system or the screen coordinate system. The rendering unit 208 creates a game image by writing to the color buffer 210 color data (RGB data) of each pixel of a 3D model projected to screen coordinates, based on a predetermined texture. The color buffer 210 is a memory region allocated to hold the game image data (RGB data) created by the rendering unit 208. The Z buffer 212 is a memory region allocated to hold information about the depth from the viewpoint which will be lost when transforming from 3D view coordinates to 2D screen coordinates. The GPU 204 creates image data to be displayed on the TV monitor 10 using these buffers and appropriately outputs the image data to the TV monitor 10 through the memory controller 220 and the video I/F 224. The audio data to be created in the CPU 202 during execution of the game program is outputted to the speaker 60 from the memory controller 220 through the audio I/F 228. Note that the present embodiment employs a hardware configuration in which the image-processing dedicated memory is additionally provided, however, the hardware configuration is not limited thereto; for example, it is also possible to employ a technique (UMA: Unified Memory Architecture) where a part of the main memory 214 is used as a memory for image processing.

In the main memory 214 there are stored various programs and data which are read from the DVD-ROM 30. The data includes, for example, data about polygons which compose a 3D model to be arranged in the virtual game space, textures used to map colors onto the polygons, and the like.

Now, the operations of the game system of the present embodiment will be described.

Figure 3:
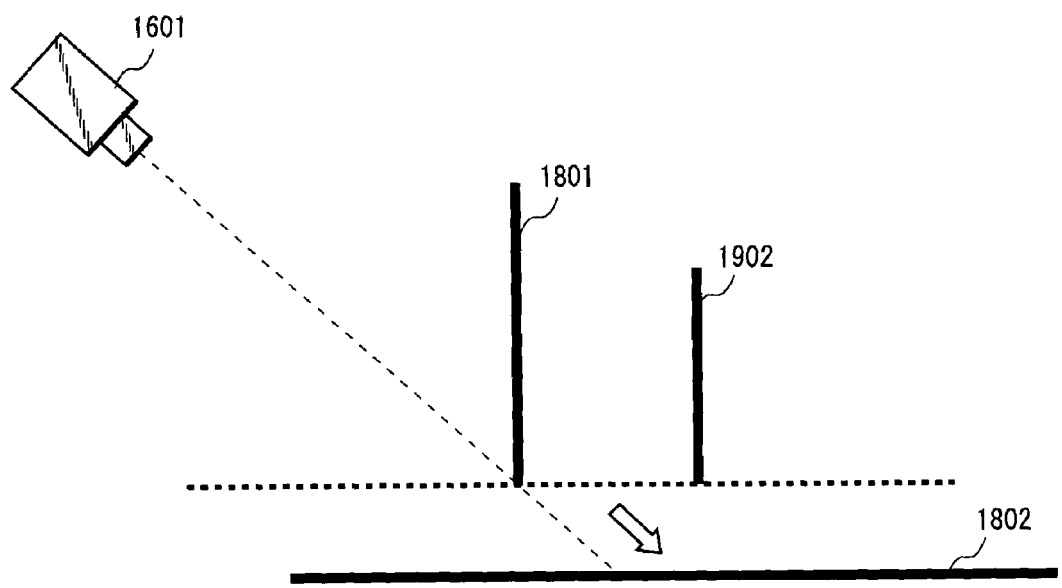
FIG. 3 is a diagram showing the principles of the present invention.
Figure 4:
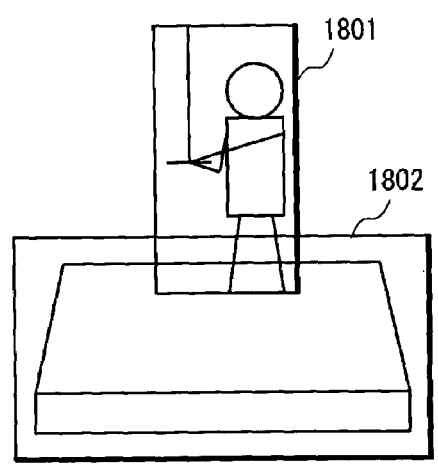
FIG. 4 is another diagram showing the principles of the present invention.
Figure 16:
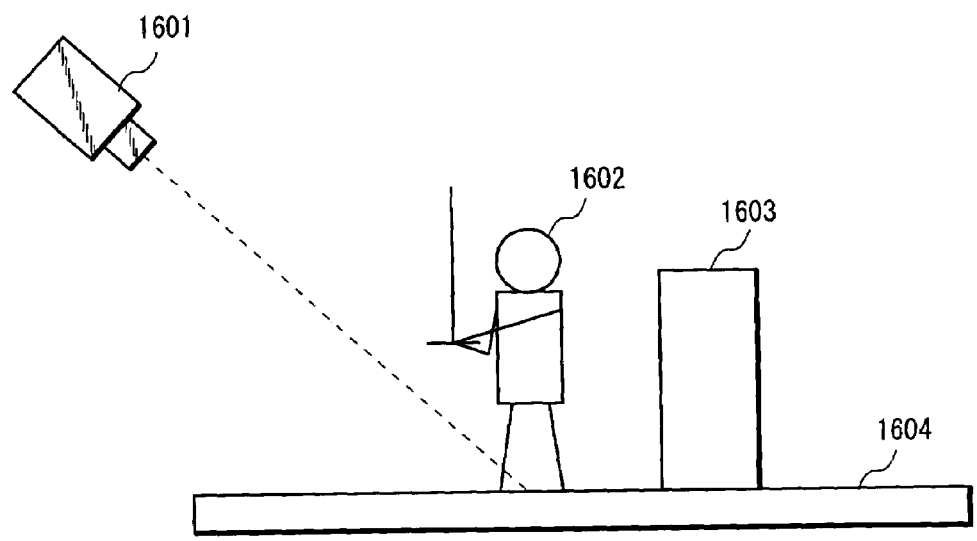
FIG. 16 is a diagram showing an exemplary arrangement of objects in a conventional game machine.
Figure 17:
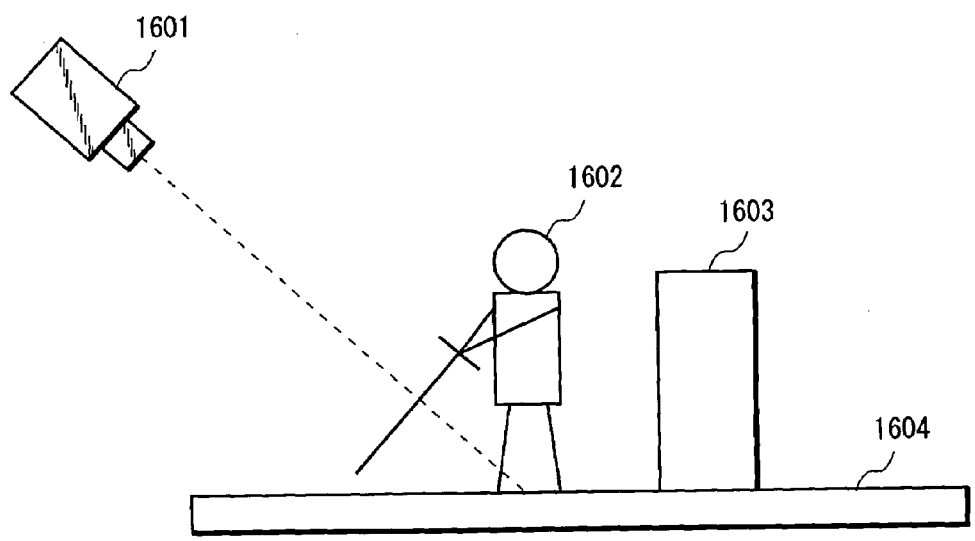
FIG. 17 is another diagram showing the exemplary arrangement of the objects in the conventional game machine.
Figure 18A:
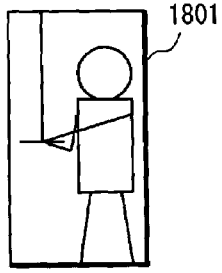
FIGS. 18A to 18C are diagrams showing an exemplary arrangement of objects in the case where planar polygons are used in place of 3D objects.
Figure 18B:
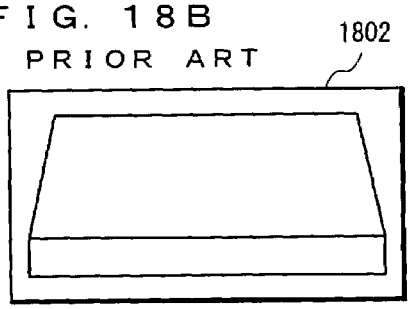
Figure 18C:
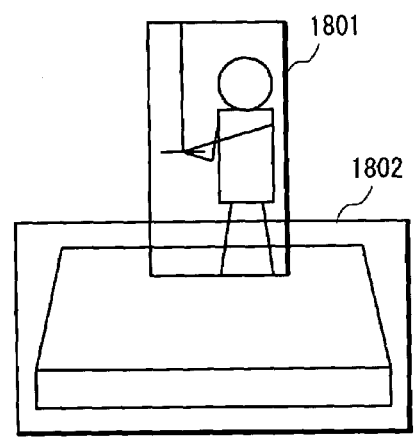
Figure 19:
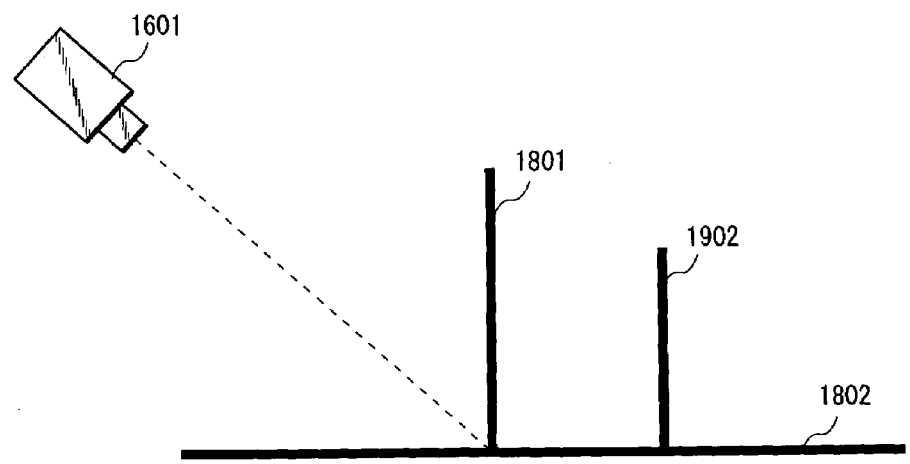
FIG. 19 is a diagram showing the objects arranged in the manner shown in FIG. 18, as viewed from a different angle.

Before providing a detailed description, first, the principles of the present embodiment will be briefly described. In the present embodiment, planar objects are used in place of the 3D objects 1602 and 1603 shown in FIG. 16. As shown in FIG. 3, character objects 1801 and 1902 which stand on a ground in a virtual space are arranged to rise on a land object 1802 (i.e., the land object 1802 and the character object 1801 are not parallel to each other). One of the reasons for arranging the character objects 1801 and 1902 to rise is to prevent overlapping of the character objects 1801 and 1902 when the character objects 1801 and 1902 are arranged so as to be laid down on the land object 1802. In the virtual space, a virtual camera 1601 is also arranged. The virtual camera 1601 is arranged in a position where the land object 1802 is captured obliquely above (i.e., a position where a vector indicating the orientation of the virtual camera 1601 forms an acute angle with the angle of the land object 1802). The objects 1801, 1802, and 1902 are arranged so as to look towards the side of the virtual camera 1601. Further, a characteristic process of the present invention is that the land object 1802 and the character object 1801 are arranged so as to keep a distance therebetween. More specifically, the land object 1802 is arranged so as to be displaced a predetermined distance from its original position along the direction of the orientation of the virtual camera 1601 and in a direction away from the virtual camera 1601 (i.e., in a direction shown by the arrow in FIG. 3). Here, since the land object 1802 is displaced from its original position along the direction of the orientation of the virtual camera 1601, the displacement of the land object 1802 is not perceived when viewed from the virtual camera 1601, and thus as shown in FIG. 4, the character object 1801 is viewed as if the character object 1801 were in its original position (i.e., the same position as that shown in FIG. 18C).

Figure 5:
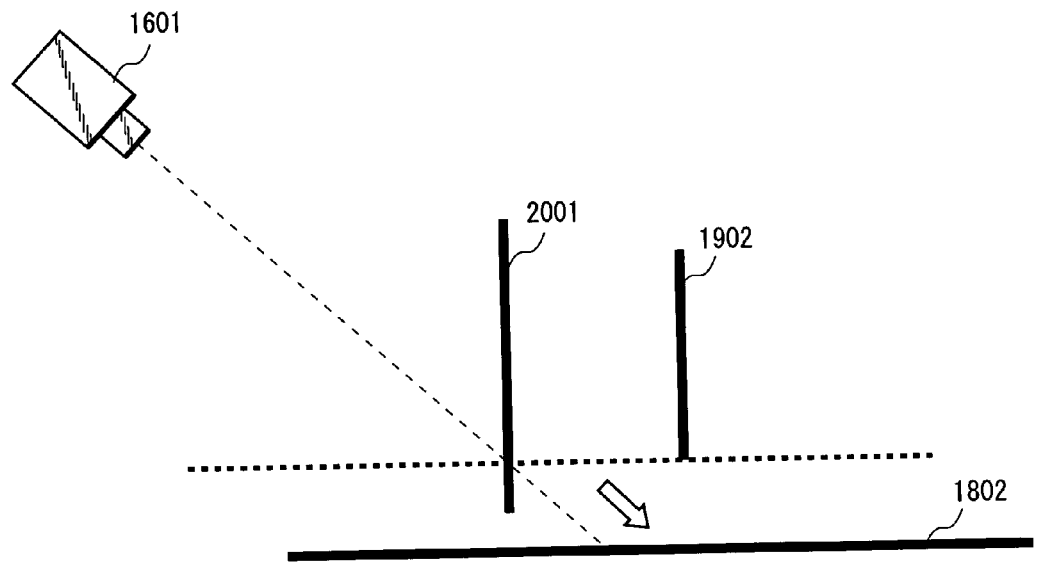
FIG. 5 is a diagram showing objects arranged in a virtual space in the embodiment of the present invention, as viewed from virtual camera.
Figure 20A:
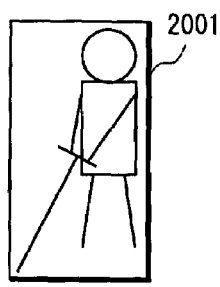
FIGS. 20A to 20c are diagrams showing an exemplary arrangement of objects in the case where planar polygons are used in place of 3D objects.
Figure 20B:
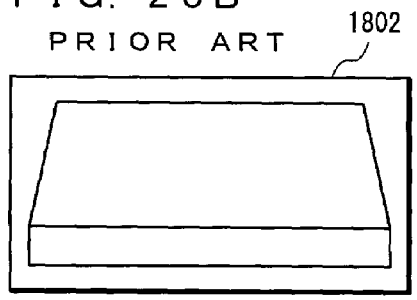
Figure 20C:
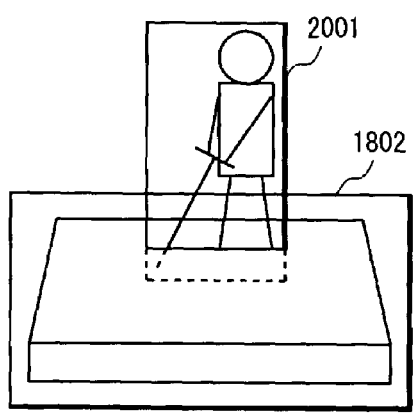
Figure 21:
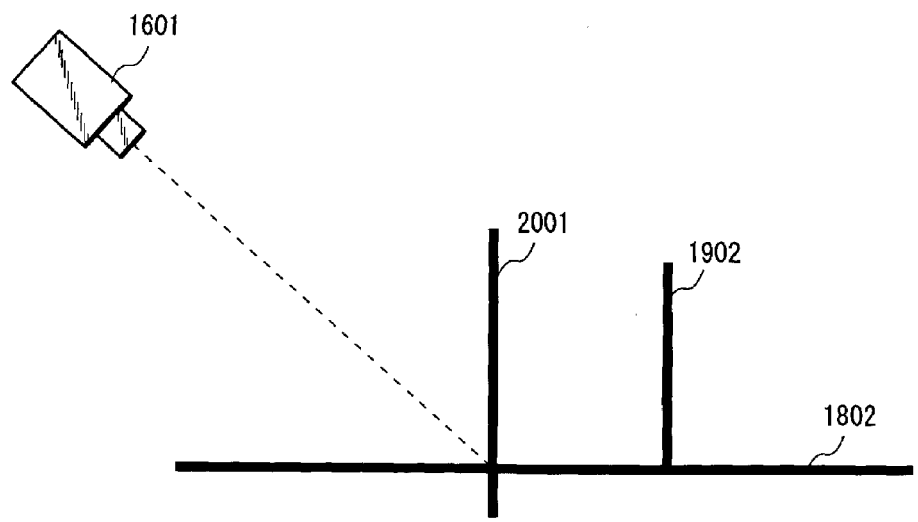
FIG. 21 is a diagram showing the objects arranged in the manner shown in FIG. 20, as viewed from a different angle.

Similarly, in the case of displaying a character object 2001 representing a character which has brought the sword down, as shown in FIG. 5, the land object 1802 is arranged so as to be displaced a predetermined distance from its original position along the direction of the orientation of the virtual camera 1601 and in a direction away from the virtual camera 1601. In this case too, the displacement of the land object 1802 is not perceived when viewed from the virtual camera 1601, and thus as shown in FIG. 6, the character object 2001 is viewed as if the character object 2001 were in its original position (i.e., the same position as that shown in FIG. 20C).

Figure 6:
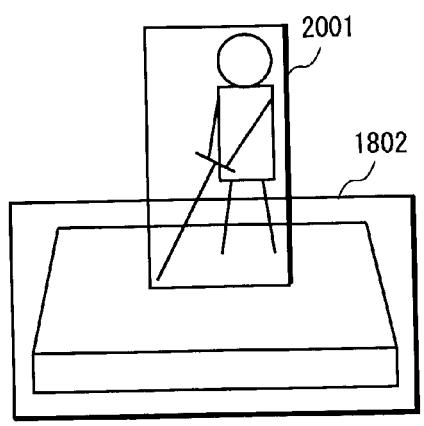
FIG. 6 is another diagram showing the objects arranged in the virtual space in the embodiment of the present invention, as viewed from the virtual camera.

Moreover, since as shown in FIG. 5, the character object 2001 and the land object 1802 do not intersect each other, the character object 2001 does not sink into the land object 1802 and even the edge of the sword can be displayed properly, as shown in FIG. 6.

Now, the operations of the main unit 20 of the game machine of the present embodiment will be described.

Figure 7:
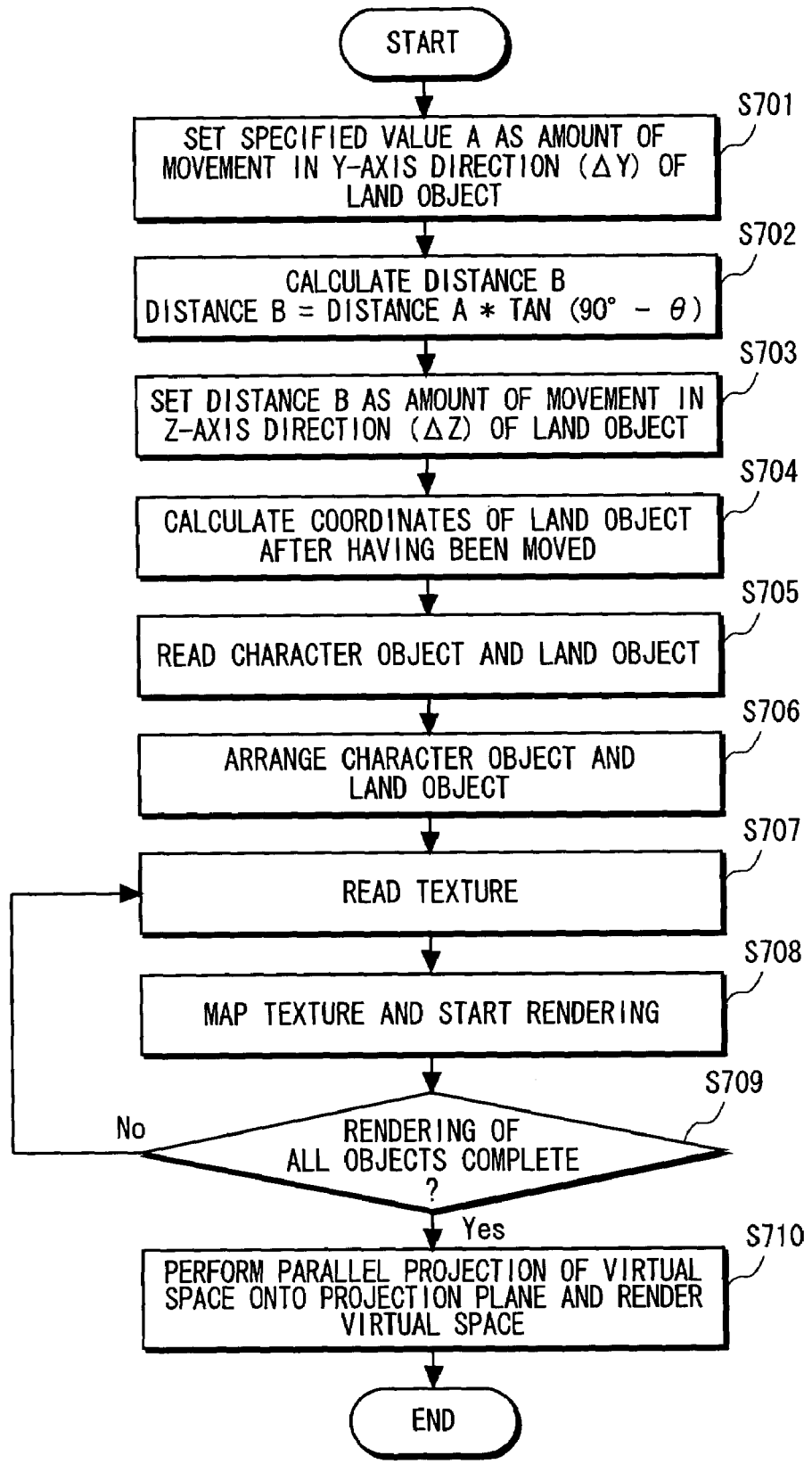
FIG. 7 is a flowchart showing the operations of the main unit 20 of the game machine.

FIG. 7 shows the flow of processing for creating an image of a scene in a 3D virtual space, as viewed from a virtual camera. Note that in the description, the following processing is performed by the CPU 202 of the main unit 20 of the game machine in accordance with the program read from the DVD-ROM 30; however, a part of the processing may be performed using the GPU 204 or hardware dedicated to image processing.

Figure 8:
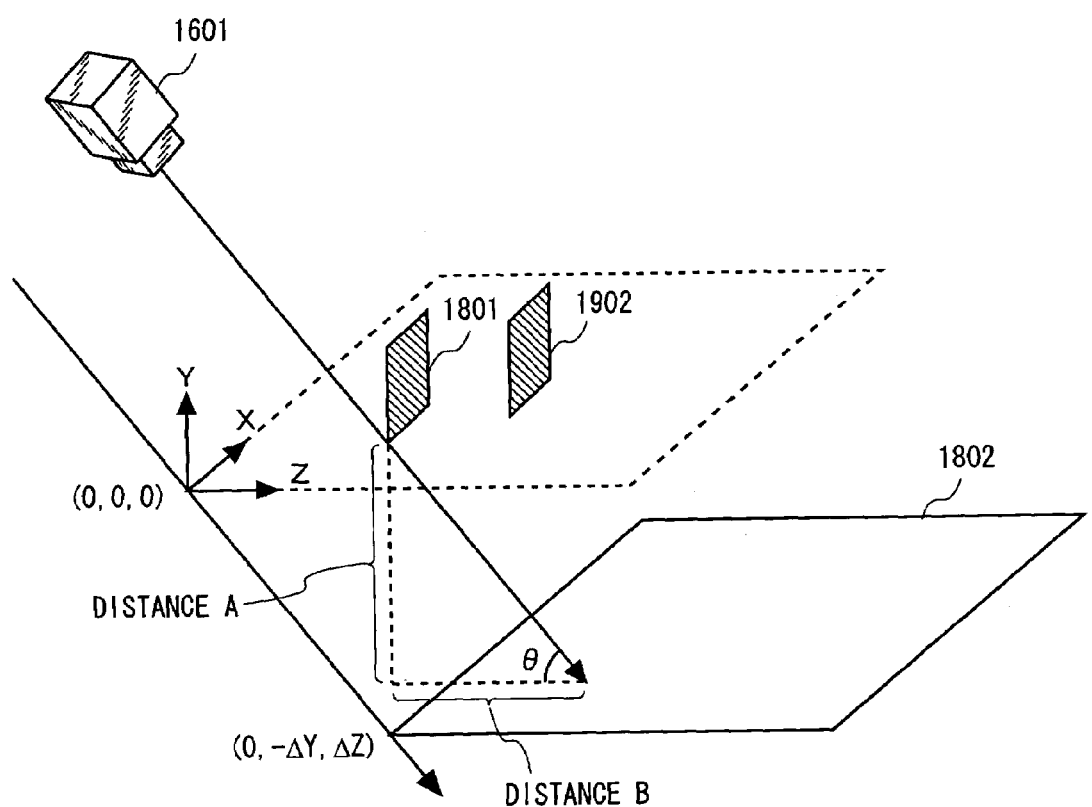
FIG. 8 is a diagram for describing processes shown in the flowchart of FIG. 7.

At step S701 in FIG. 7, the CPU 202 sets specified value A which is preset, as the amount of movement in a Y-axis direction ($\Delta Y$) of a land object 1802 (see FIG. 8). The specified value A is set to a value large enough so that at least a character does not sink into the land.

At step S702, the CPU 202 calculates distance B shown in FIG. 8 based on distance A (specified value A), a vector indicating the orientation of a virtual camera 1601, and angle $\theta$ of the land object 1802. A specific calculation method is shown in FIG. 7.

At step S703, the CPU 202 sets the distance B calculated at the previous step as the amount of movement in a Z-axis direction ($\Delta Z$) of the land object 1802 (see FIG. 8).

At step S704, the CPU 202 calculates the coordinates of the land object 1802 after having been moved.

At step S705, the CPU 202 reads character objects 1801 and 1902 and the land object 1802 from the main memory 214.

At step S706, the CPU 202 arranges the character objects 1801 and 1902 having been read at the previous step in predetermined positions in the virtual space. In addition, the CPU 202 arranges the land object 1802 having also been read at the previous step in a position which takes into account the amount of movements having been set at steps S701 and S703 (i.e., a position where the land object 1802 is moved $\Delta Y$ in the Y-axis direction and $\Delta Z$ in the Z-axis direction from its original position along the direction of the orientation of the virtual camera 1601 and in a direction away from the virtual camera 1601) (see FIG. 8).

At step S707, the CPU 202 reads texture for each object from the main memory 214. At step S708, the CPU 202 maps the read texture onto each object and then starts rendering. Then, at step S709, the CPU 202 determines whether rendering of all objects has been completed, and if the rendering has been completed, processing proceeds to step S710. If there is any object whose rendering has not been completed, processing returns to step S707 and the CPU 202 performs the process of texturing.

At step S710, the CPU 202 performs a parallel projection (orthogonal projection) of a scene in the virtual space which is captured by the virtual camera 1601 onto a projection plane using a transformation matrix, renders the scene, and then stores a rendering result in the color buffer 210.

By performing the above-described processing, even in the case of displaying the character object 2001, for example, the character object 2001 is viewed as if the character object 2001 were in its original position. Moreover, an image such that the character object 2001 does not sink into the land object 1802 can be created.

Figure 9:
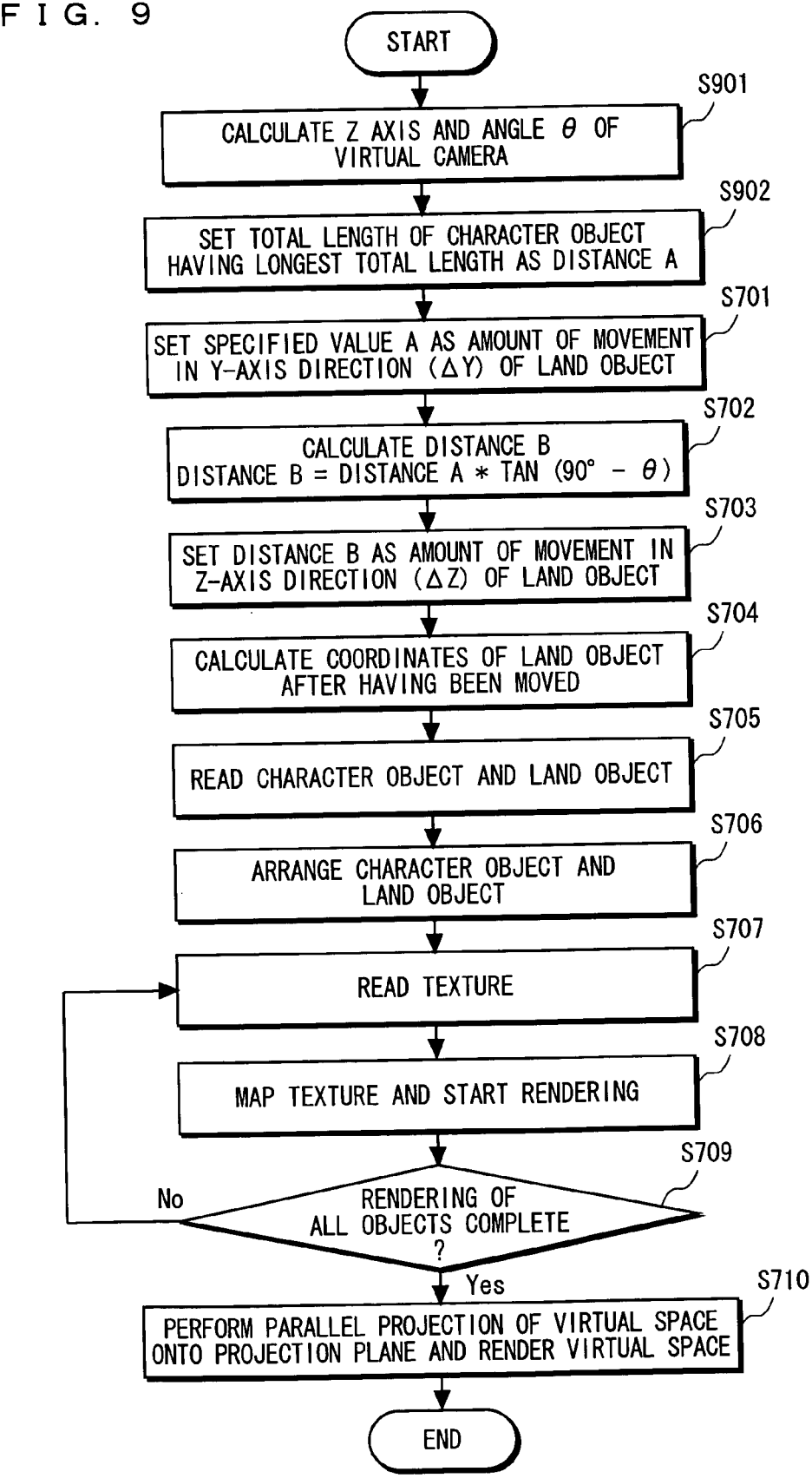
FIG. 9 is another flowchart showing the operations of the main unit 20 of the game machine.
Figure 10:
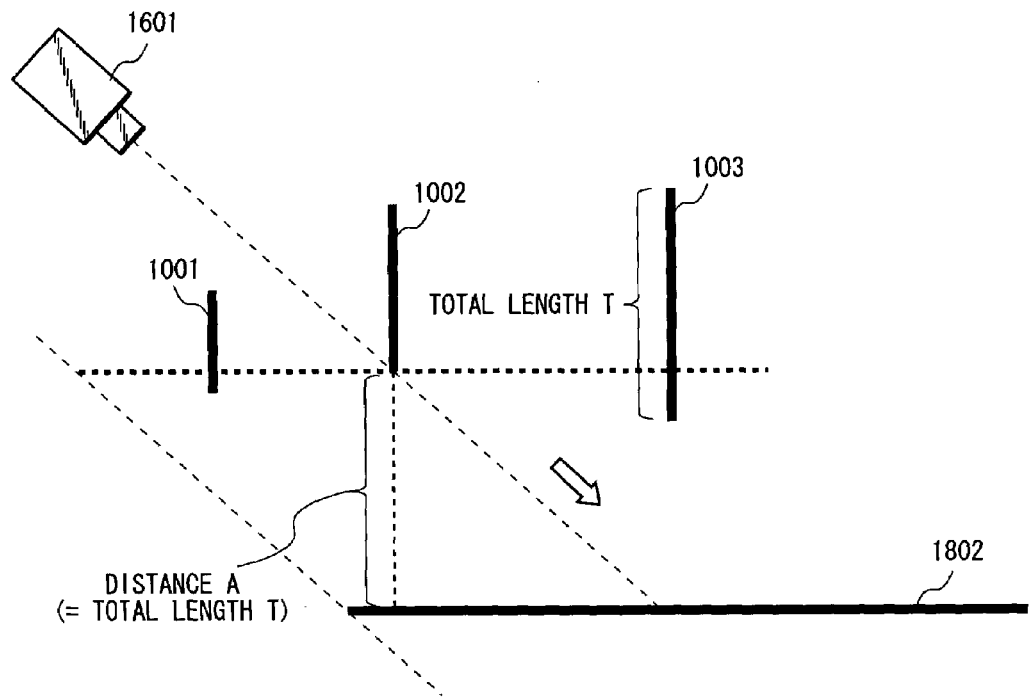
FIG. 10 is a diagram for describing processes shown in the flowchart of FIG. 9.

Note that although in FIG. 7 the distance A is a preset, specified value, the distance A may be determined dynamically, depending on the situation. For example, as shown in FIG. 9, at step S901, the CPU 202 calculates the Z axis and the angle θ of the virtual camera 1601. Then, at step S902, as shown in FIG. 10, among character objects 1001 to 1003 corresponding to a plurality characters which stand on a land object 1802, the CPU 202 sets the total length T of a character object having the longest total length (the character object 1003 in the present example) as the distance A. By doing so, it is ensured that none of the character objects ever sink into the land object 1802. Processing from step S701 to step S710 in FIG. 9 is the same as that shown in FIG. 7, and thus the description thereof will be omitted. Further, as the distance A, other values may be set. For example, the length of a planar polygon extended downward from the feet of a character may be calculated and set as the distance A.

Although the present embodiment describes an example where a land object is displaced in a direction away from a virtual camera, the same advantageous effects as those obtained in the above example can be obtained by displacing a character object in a direction towards the virtual camera. In this case, the distance of displacement in the direction towards the virtual camera may be set differently for each character object. In addition, both the land object and the character object may be relatively displaced a predetermined distance form their original positions along the direction of the orientation of the virtual camera.

Figure 11:
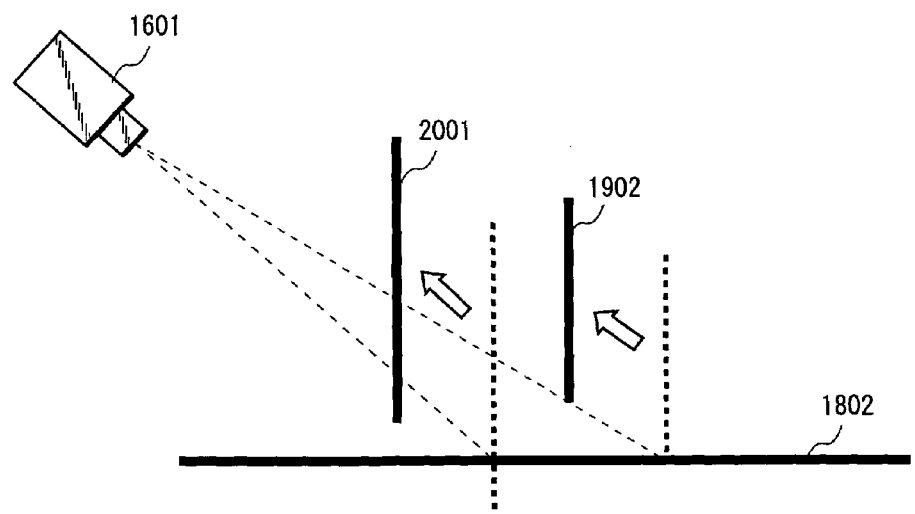
FIG. 11 is a diagram showing a variant of the embodiment of the present invention.

Furthermore, in the present embodiment, a scene in the virtual space which is captured by the virtual camera is subjected to a parallel projection onto a projection plane and then the scene is rendered. In addition to this, the present invention can also be applied to the case where the scene is rendered by performing a perspective projection. In this case, as shown in FIG. 11, each object is displaced along a straight line connecting a virtual camera 1601 and each object. Note, however, that in the case of performing a perspective projection, when an object is displaced along the direction of the orientation of the virtual camera 1601, the size of the object to be displayed in an image changes somewhat. Therefore, in the case of performing a perspective projection, it is preferred that each object be scaled up or down depending on the direction of displacement and the distance of displacement, so as to create an image which is less incongruous.

Figure 12:
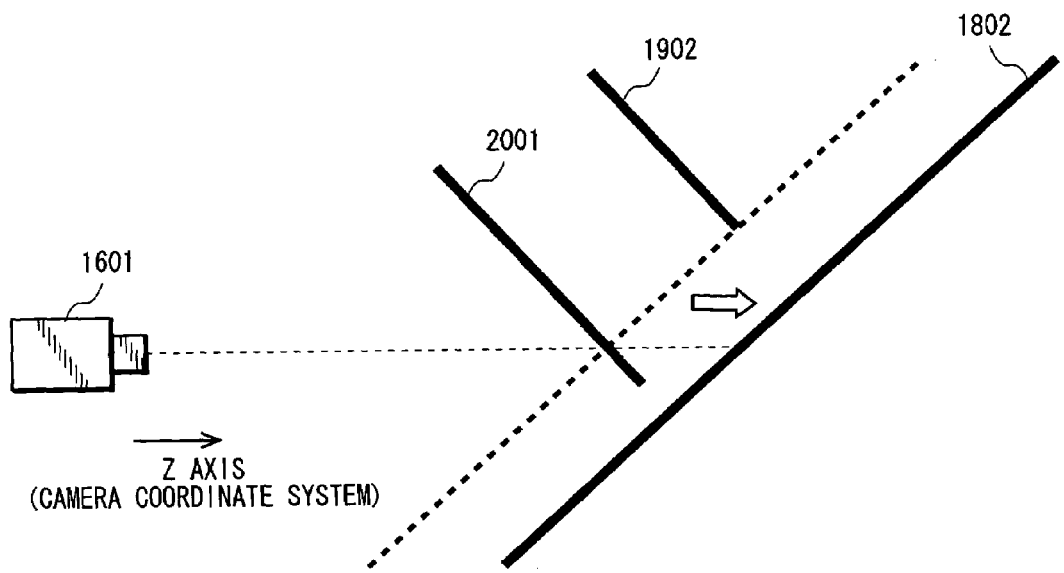
FIG. 12 is a diagram showing another variant of the embodiment of the present invention.
Figure 13:
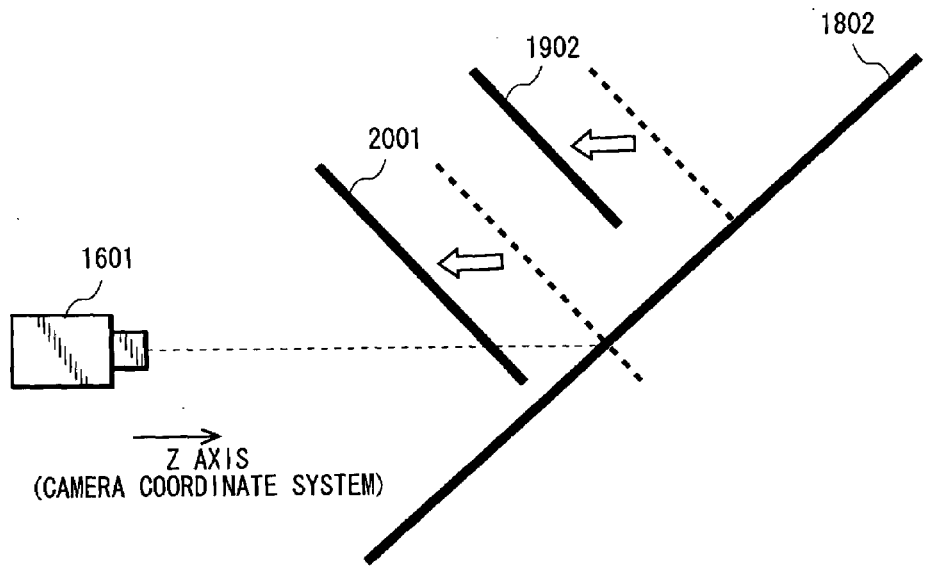
FIG. 13 is a diagram showing still another variant of the embodiment of the present invention.

Moreover, in the present embodiment, a character object and a land object are arranged in a virtual space such that the positional relationship between the character and land objects is displaced from its original positional relationship. Instead of this method, the positional relationship between the character and land objects may be displaced from its original positional relationship during the process of rendering the objects arranged in the virtual space. For example, after transforming the coordinates of each object which is represented in the world coordinate system into the camera coordinate system which is based on the virtual camera 1601 using a transformation matrix, the positional relationship between the character and land objects may be displaced from its original positional relationship. In this case, as shown in FIGS. 12 and 13, a character object 2001 or a land object 1802 just needs to be displaced along a Z-axis direction of the camera coordinate system (i.e., a predetermined value is added to or subtracted from a Z coordinate value), and therefore processing becomes simpler. In this manner, the process of displacing each object may be performed using any of transformation matrices which are used in the process of performing a projection of a virtual space onto a projection plane. In addition, an offset value which takes into account the amount of displacement may be added to a Z value for hidden-surface processing which is obtained after the transformation process.

In the present embodiment, a character object does not necessarily need to be composed of one polygon. For example, by using three polygons 1401 to 1403 shown in FIGS. 14A to 14C, a character object 1501 may be composed, as shown in FIGS. 15A and 15B.

Moreover, in the present embodiment, a plurality of planar objects are arranged in a virtual space; however, the present invention is not limited thereto. A 3D object may be arranged in addition to a planar object. Further, the land object may be a 3D object (for example, a cuboid). Similarly, the character object may be a 3D object (for example, a cuboid) and texture corresponding to an image of a character may be mapped onto the 3D object, thereby representing the character.

In the present embodiment, a character object is arranged perpendicular to a land object; however, the present invention is not limited thereto. For example, the character object may be arranged so as to face the front of a virtual camera (i.e., to have a perpendicular relationship between a vector indicating the orientation of the virtual camera and the plane of the character object).

While the invention has been described in detail, the foregoing description is in all aspects illustrative and not restrictive. It is understood that numerous other modifications and variations can be devised without departing from the scope of the invention.

What is claimed is:

1. An image creation program for causing a computer to perform a process of creating an image to be viewed from a virtual camera in a 3D virtual space having arranged therein objects, by performing a projection transformation of a scene in the 3D virtual space onto a projection plane which is based on the virtual camera, and rendering the scene in a rendering region, the program allowing the computer to act as:

object reading means for reading a first object and a second object from a memory, the first object being composed of at least one polygon and in a planar format and the second object being composed of at least one polygon;

first arrangement means for arranging the read first object to rise on a horizontal plane in the 3D virtual space;

second arrangement means for arranging the read second object in an opposite direction to a direction in which the horizontal plane looks towards the virtual camera, and substantially parallel to the horizontal plane with a space between the horizontal plane and the second object;

texture reading means for reading ground texture and character texture from the memory, the ground texture used in representing a ground in the 3D virtual space and the character texture used in representing a character to be displayed in a position which is in contact with the ground; and rendering means for rendering the image in the rendering region by performing a projection transformation of the first object and the second object onto the projection plane, mapping the read character texture onto the first object, and mapping the read ground texture onto the second object.

2. The image creation program according to claim 1, wherein the first arrangement means arranges the first object such that a plane of the first object is substantially perpendicular to the horizontal plane and looks towards a side of the virtual camera.

3. The image creation program according to claim 1, wherein the first arrangement means arranges the first object such that a plane of the first object looks towards the virtual camera.

4. The image creation program according to claim 1, wherein
   a size of the first object changes depending on a display content of the character texture, and
   the second arrangement means arranges the second object with a space between the horizontal plane and the second object, the space being equal to or greater than a length of the change in the size of the first object in a direction perpendicular to the horizontal plane.

5. The image creation program according to claim 1, wherein the first object is one of a game character and a special-effect character, the game character being modeled after a person in the 3D virtual space and the special-effect character displaying a special effect to be created in the 3D virtual space.

6. The image creation program according to claim 1, wherein the computer is further allowed to act as means for arranging the virtual camera in the 3D virtual space such that an orientation of the virtual camera forms an acute angle with the horizontal plane.

7. A method of creating an image of a 3D virtual space to be viewed from a virtual camera arranged in the 3D virtual space, the method comprising the steps of:
   arranging in the 3D virtual space at least a land object corresponding to land and a character object corresponding to a character which stands on the land; and
   rendering the land object and the character object arranged in the 3D virtual space such that a positional relationship between the character and land objects is displaced a predetermined distance from its original positional relationship along a direction of an orientation of the virtual camera.

8. The method according to claim 7, wherein
   the character object is in a planar format,
   at the arrangement step, the character object is arranged on a ground in the 3D virtual space so as to be substantially perpendicular to the ground, the ground being specified by the land object, and
   at the rendering step, texture which represents a character is mapped onto the character object.

9. The method according to claim 7, wherein at the arrangement step, the land object and the character object are arranged such that a positional relationship between the character and land objects is displaced a predetermined distance from its original positional relationship along a direction of an orientation of the virtual camera.

10. The method according to claim 7, wherein at the rendering step, when positions of the land object and the character object are transformed into the camera coordinate system based on a position of the, virtual camera, a Z coordinate value of one of the land object and the character object is displaced a predetermined value.

* * * * *